(No Model.)
2 Sheets—Sheet 1.
J. W. HEWITT.
SHIFTING SEAT FOR VEHICLES.
No. 256,683.
Patented Apr. 18, 1882.
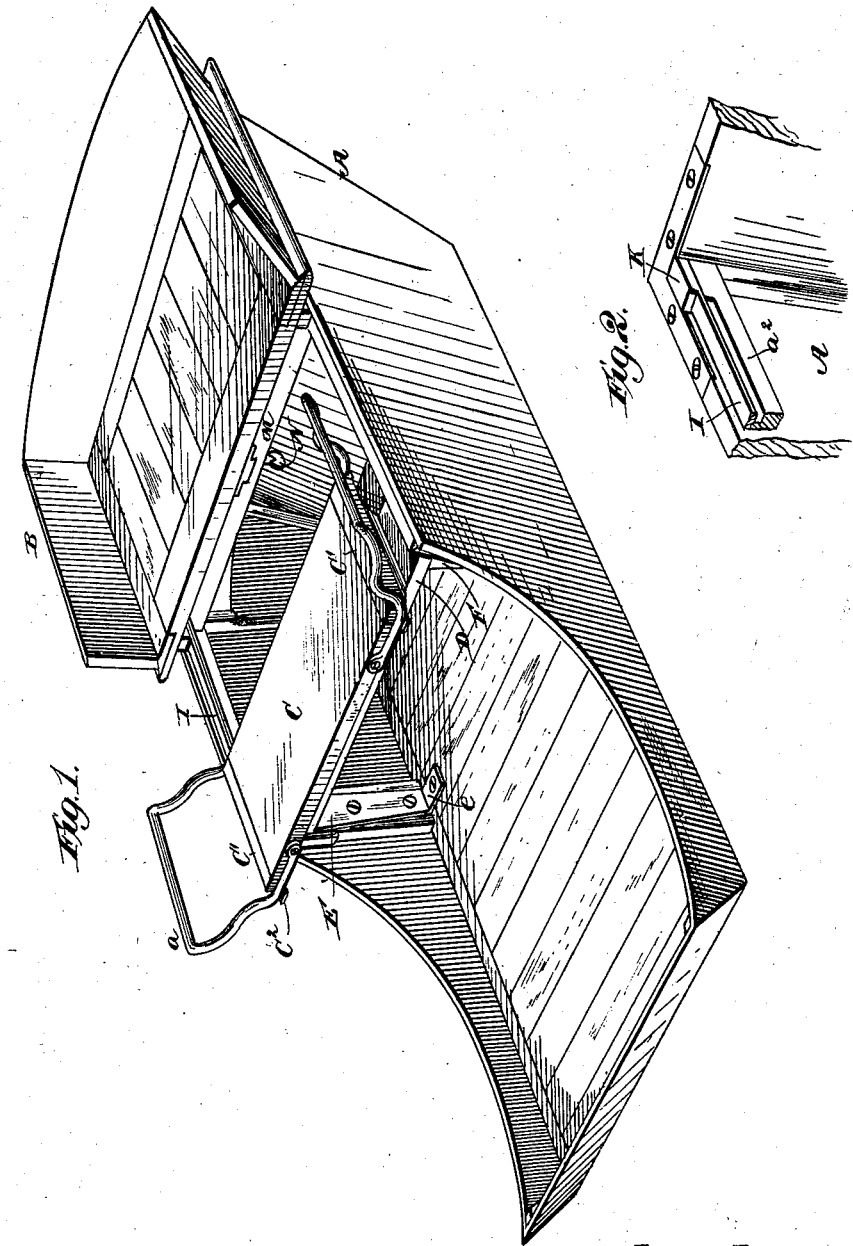
Witnesses.
Robert Everett
F. G. Kincaid
Inventor.
Jackson W Hewitt.
By Chas. G. Page Atty.
N. PETERS. Photo-Lithographer, Washington, D. C.

(No Model.)  2 Sheets—Sheet 2.
J. W. HEWITT.
SHIFTING SEAT FOR VEHICLES.
No. 256,683. Patented Apr. 18, 1882.
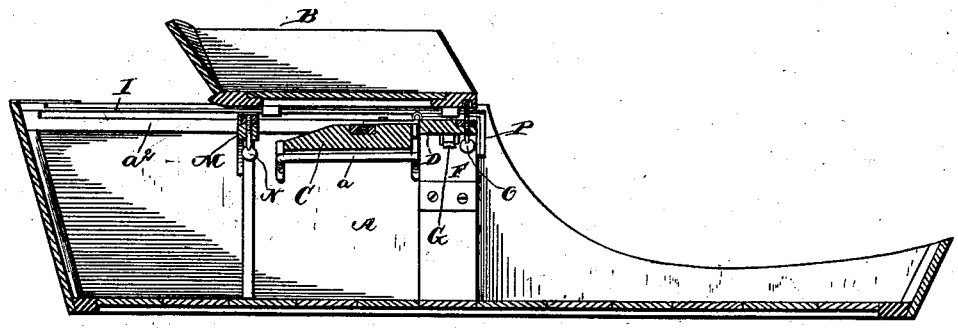
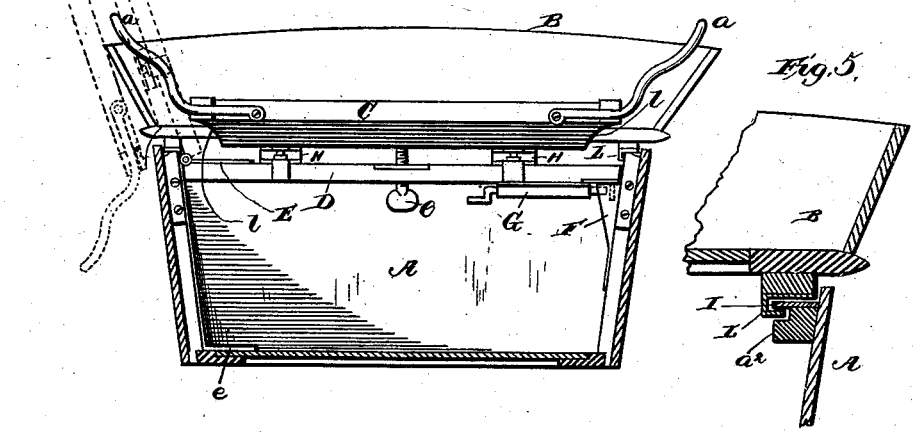
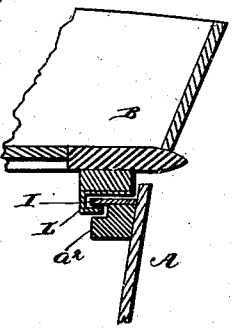
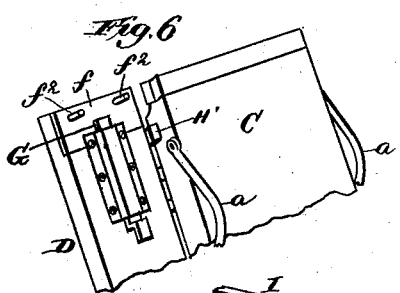
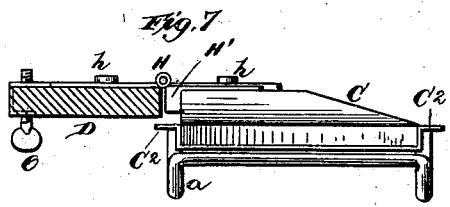
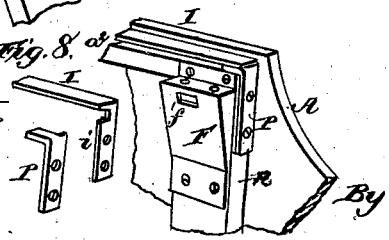
Witnesses.
Robert Everett
F. H. Kincaid
Inventor.
Jackson W. Hewitt.
By Chas. G. Page
Atty.
N. PETERS. Photo-Lithographer, Washington, D. C.

UNITED STATES PATENT OFFICE.

JACKSON W. HEWITT, OF JACKSON, MICHIGAN.

SHIFTING SEAT FOR VEHICLES.

SPECIFICATION forming part of Letters Patent No. 256,683, dated April 18, 1882.

Application filed February 14, 1882. (No model.)

*To all whom it may concern:*

Be it known that I, JACKSON W. HEWITT, a citizen of the United States, residing at Jackson, in the county of Jackson and State of Michigan, have invented certain new and useful Improvements in Vehicles, of which the following is a specification, reference being had therein to the accompanying drawings.

This invention relates to two-seated vehicles in which the front seat is hinged and adapted to be folded back and the rear seat adapted to be shifted forward over the front seat, so as to convert the vehicle from a two to a one seated vehicle.

The object of the invention is to adapt the front seat to be either folded back, so that the rear seat can be shifted forward and over it, or raised upon end, so that there will be a free passage to the rear seat, it being understood that the said front seat, as constructed and arranged by me, is capable of performing both of these functions.

A further object is to provide an improved support for the front folding seat, and to so arrange this support that it can be either let down and secured in position transversely across the vehicle-body or be raised at one end and carry up the seat with it.

A further object is to provide certain improved features of construction and combination, all of which are illustrated in the annexed drawings, in which—

Figure 1 is a perspective view of the vehicle-body with its two seats in position for use. Fig. 2 represents one of the rear corners of the body, and illustrates one of the stops that are employed for limiting the back movement of the rear seat. Fig. 3 is a longitudinal section taken on a vertical central plane through the vehicle-body, the front seat in this figure being shown swung back upon its hinges and the rear seat moved into position over the front seat. Fig. 4 is a transverse section taken in front of the front seat, and illustrates in dotted lines the way in which the front seat and its support are raised at one end, so as to leave an unobstructed passage to the rear seat. Fig. 5 is a detail sectional view, illustrating the connection between the rear sliding seat and the vehicle-body. Fig. 6 is a detail perspective view, illustrating a portion of the under side of the support for the front seat, a portion of the front seat being also shown swung back into the position indicated in Fig. 3. Fig. 7 illustrates a section taken transversely through the support for the front seat and an end view of the front seat swung back into the position shown in Fig. 3. Fig. 8 is a detail view, illustrating the recessed plate that receives the locking-bolt on the front-seat support, and also showing the devices employed for preventing the rear seat from slipping off from the front ends of its supporting-rails.

In the several figures like letters indicate like parts.

A refers to the vehicle-body, which will be mounted upon running-gear, as usual.

B indicates the sliding back seat; C, the hinged front seat; and D, the hinged support for the front seat, said support consisting of a board or bar adapted to extend across the vehicle-body, as best illustrated in Fig. 4. This support for the front seat is hinged to the body by a large hinge, E, one leaf of which extends down to the bottom of the body, where it is bent into angular form and fitted against the said bottom, as indicated at $e$ in Figs. 1 and 4. By reason of this connection of the support with the body it can be raised at one end and swung to one side of the body, as shown in dotted lines, Fig. 4; or it can be let down so that its free end will rest upon a plate or bracket, F, that is secured to the body, so as to form a bearing for this end of the support. This plate or bracket is formed with a socket, $f'$, for receiving a slidable bolt, G, carried upon the under side of the support D, so that the latter can be locked down when desired. The construction of bolt is not essential, since it will be evident that a spring-catch might be employed for locking down the support.

As a further means of connecting the hinged support with the bracket F, I provide the support upon its under side with a metal plate, $f$, having pins $f^2$, which, when the support is let down, enter recesses formed in the upper side of the bracket, thereby effectually preventing any lateral movement of the support, and also relieving the locking device from strain. The front seat is hinged along its rear edge to this support by means of the hinges H, which admit of the seat being swung back into the position shown in Figs. 3, 6, and 7.

In order to provide checks or bumpers against which the seat will strike when it is thus swung back, so as to prevent injury to its hinges, and also so as to hold it steady while it is in the position indicated in said figures, I provide angle-plates H', one of which is best illustrated in Fig. 7, and I secure these angular check-plates to the under side of the seat, so that they will also embrace the rear edge thereof. Hence when the seat is swung back they will abut against the support. The same result, however, could be attained by securing them to the support instead of to the seat.

As a means for steadying the seat upon the support and maintaining it in a level position thereon, and also to make allowance for the space occupied by the seat-hinges, I have arranged the bumpers $h$ upon the leaves of the hinges so that when the seat is in position for use these checks or bumpers will come together, and thereby support the seat. They can be made of metal, or they can, if preferred, be formed of elastic cushions.

Rails $a^2$, grooved along their upper edges, are secured to the sides of the vehicle-body, and to these rails or bars are fastened the metal rails I, upon which the back seat is supported and slides. These rails I have the stops K at their rear ends, so as to check the back movement of said rear seat and prevent its slipping off at this end of the vehicle.

The back seat is provided upon its under side with the bent lips L, which fit the rails I, as best shown in Fig. 5, whereby while the seat will be free to slide along these rails, it will be securely held thereon.

M indicates a cross-bar which is secured to the sides of the body and crosses the latter at a point between the front seat and the back of the vehicle-body, the location of said bar being such that it will be under the back seat whether the back seat is at the rear, as in Fig. 1, or in front over the front seat, as in Fig. 3. The thumb-screw N passes up through this bar, and the back seat will be provided upon its under side with a suitable metal socket, into which the screw can be turned when it is desired to secure the back seat in position at the rear end of the vehicle-body. A like thumb-screw, O, passes up through the support D, and the front seat will be provided upon its under side with a metal socket for receiving this thumb-screw, so as to lock the front seat down upon its support, and thus prevent it from tilting back. But it will be evident that more than one thumb-screw might be employed for thus locking down the front seat, and that other kinds of fastening devices might be employed for such purpose. That shown, however, will be found simple and effective. The bent arms $a$ at the ends of the front seat are pivoted to the latter, so that they can be unfolded into the position shown in Fig. 4, or folded down upon the seat when the latter is swung back, as in Fig. 7. To the ends of the front seat are secured the metal plates C', that are bent down at their ends and extended out from the edges of the seat, as at $C^2$, Fig. 1. These extended ends of said plates form rests for the pivoted arms when the latter are unfolded, as illustrated in said figure. The rails I are bent down at their front ends, as at $i$, Fig. 8, these downwardly-extended ends being fastened to the braces R, that are secured to the body and form part of the same.

To prevent the front seat from slipping off from these rails at their front ends, and yet to admit of the removal of the seat when necessary, I secure the angle-plates P to the forward ends, $i$, of the rails by means of bolts or screws, the horizontal ends of said angle-plates passing between the rails I and the grooved bars $a^2$, thereby forming stops, which can be removed at will.

When it is desired to let a person pass to the back seat the front seat and its support will be swung up on end, as shown in dotted lines, Fig. 4. When the vehicle is to be used with two seats the front and back seats can be arranged as shown in Fig. 1, and the seats fastened down.

If it is desired to use the rear seat only and dispense with the front seat, the latter will be unfastened and swung back, and the rear seat then moved forward over the front seat, as in Fig. 3, so that the vehicle will have but one seat, and that in the middle. The rear seat can now be secured in this position by means of the thumb-screw or analogous fastening previously employed for fastening down the front seat. The front seat is concaved at its ends, as at $l\ l$, so that when it is raised in conjunction with its support, as shown in dotted lines, Fig. 4, it will clear the upper edge of the vehicle-body. This configuration also gives an ornamental appearance to the seat.

Having thus described my invention, what I claim, and desire to secure by Letters Patent, is—

1. The combination, in a two-seated vehicle having a rear shifting seat, of the vehicle-body with the front seat hinged at its rear edge, so as to be turned back and lowered within the vehicle-body, and having a support constructed so that the seat can be raised at one end and brought into a vertical position at one side of the vehicle-body, substantially as and for the purpose described.

2. The combination, in a two-seated vehicle, of the support D for the front seat, extending transversely across the body of the vehicle, and hinged at one of its ends to one of the sides of the said body, with the front seat hinged to the said support at one of its side edges, the said support being adapted to be raised at one end, and the seat being connected with the support so as to either rest upon the same or to be swung backward, so that the rear slidable seat can be brought over the seat and the support, substantially as described.

3. The combination, in a vehicle having a rear shifting seat, of the front seat, hinged at its rear edge, with the support D for the front seat, hinged at one end to one side of the body and extending from side to side of the same, a device for locking down the free end of the support, and the bracket F, constituting a rest for the free end of the support, and also adapted to be engaged by the said locking device, substantially as described.

4. The combination, with the seat C, hinged at its rear edge to a support, D, that is hinged at one end to one of the sides of the body and extended transversely across the latter, of the bracket F, secured to the opposite side of the body and provided with vertical recesses, and the pins upon the said support located to enter the recesses in the bracket when the free end of the support is rested thereon, substantially as described.

5. The combination, with the hinged support D, of the seat C, hinged to said support, and the bumpers $h$ upon the under side of the seat and the upper side of the support, substantially as described.

6. The combination, with the rear slidable seat, B, of the front seat, C, hinged at its rear edge and adapted to be turned down in order to admit of the rear seat being moved over it, and a locking device adapted to be engaged with the front seat so as to hold the same down in position for use, or to be engaged with the rear seat after the front seat has been swung back and the rear seat moved forward and over it, substantially as described.

7. The combination, with the rear sliding seat having the bent lips L, of the rails I, supporting the seat and engaged by said lips, the bars $a^2$, supporting the rails and secured to the vehicle-body, and the angular stop-plates P, having their upper ends inserted between the bars and the rails, said stop-plates being detachably secured to the braces R, substantially as set forth.

8. The combination, with the vehicle-body, of the support D for the front seat, hinged at one end to one side of the body, and the seat C, hinged to said support, and having its ends concaved upon the under side thereof, in the manner shown and for the purpose described.

9. The combination, with the support D for the front seat, hinged at one end to the vehicle-body, of the seat C, hinged at its rear edge to the said support, and the check-plates H', applied substantially as shown and described, and for the purpose specified.

In testimony whereof I affix my signature in presence of two witnesses.

JACKSON W. HEWITT.

Witnesses:
   JOSEPHENE A. VAN HORN,
   W. HENRY VAN HORN.